Patented Dec. 3, 1940

2,223,797

UNITED STATES PATENT OFFICE 2,223,797

RECOVERY OF LACTIC ACIDS FROM CRUDE SOLUTIONS THEREOF

John B. Tindall, Terre Haute, Ind., assignor to Commercial Solvents Corporation, Terre Haute, Ind., a corporation of Maryland No Drawing. Application January 22, 1940, Serial No. 315,003

7 Claims. (Cl. 260—535)

My invention relates to a process for the recovery of lactic acid from solutions containing the same. More particularly, my invention relates to an improved process for the recovery of purified lactic acid by subjecting crude solutions thereof to extraction with a nitroparaffin.

There are numerous occasions in commercial operations wherein it is desired to recover lactic acid from its crude solutions. This is particularly true in the case of the recovery of unreacted lactic acid in esterification processes and also in instances where said lactic acid is produced by the action of certain microorganisms on carbohydrate materials. In order to effect this end, various solvent materials have been proposed, as well as the use of materials which tend to form azeotropic mixtures with water or other impurities contained in such solutions. In this connection, numerous esters and chlorinated hydrocarbons, have in the past found considerable use, but have not been entirely satisfactory. In the case of procedures involving the utilization of esters such compounds, under certain conditions, tend to hydrolyze after extended periods of use. Similarly, chlorinated hydrocarbons if employed over long periods of time tend to decompose, liberating hydrochloric acid which is a decided disadvantage in that the extraction apparatus often becomes corroded. Other compounds such as ethers have also been employed for such purposes and have been found, in general, to serve quite satisfactorily when employed on a relatively small scale. However, compounds of this type have not been found to be entirely suitable when employed in recovering lactic acid on a large scale. Although the lower aliphatic ethers are, in general, very good solvents for lactic acids, their high volatility is a serious handicap to their commercial application in extraction processes. Ethers, such as isopropyl ether, which has been used for the extraction of lactic acid from crude solutions thereof, possess an additional disadvantage in that they do not remove certain coloring matter which is oftentimes present in the crude solutions of lactic acid. Other methods have been concerned with the distillation of the crude acid mixture. However, the principal difficulty encountered in such methods, is that considerable decomposition of the lactic acid occurs if such operations are not carefully controlled.

I have now discovered that lactic acid may be effectively and economically recovered from its crude solutions by subjecting the crude acid solution to extraction with a nitroparaffin in which the said lactic acid is soluble and the remaining constituents of the crude acid solution substantially insoluble. Furthermore, I have found, in contrast with prior art methods, that only relatively small volumes of nitroparaffins are required to satisfactorily extract lactic acid from crude solutions thereof. I have further found that it is particularly advantageous to utilize nitroparaffins in the extraction of lactic acid due to their high degree of stability and their relatively low volatility under the conditions employed.

In accordance with my invention, I may subject the crude lactic acid solution to either batch or continuous extraction with a suitable nitroparaffin at normal or elevated temperatures. The acid-nitroparaffin layer is then separated and the purified acid recovered therefrom in a known manner, such as for example by subjecting said layer to vacuum distillation, or if the particular nitroparaffin utilized is volatile with steam, steam distillation may be employed.

The apparatus utilized in carrying out my invention is not at all critical. When employing batch extraction methods in removing lactic acid from its crude solution with a nitroparaffin, any apparatus may be employed which possesses a suitable means for agitating the mixture and a convenient means for separating the solvent layer from the crude acid layer after said mixture has been allowed to stand for a period sufficient to permit satisfactory separation of the two phases.

In carrying out my process continuously, any of the known continuous solvent extraction methods may be employed. However, I prefer to utilize an extraction tower in carrying out my invention, said tower being internally arranged in such a manner that there is maximum contact between the solvent and the crude lactic acid mixture. Continuous extraction of the crude lactic acid solution by the use of nitroparaffins may be effected by introducing said acid mixture at the top of the tower and conducting the nitroparaffin through a suitable inlet into the bottom of the tower. Upon being brought into contact with the counter-currently flowing crude lactic acid solution, the nitroparaffin and said solution form two liquid phases which separate within the extraction zone and the nitroparaffin layer containing the extracted lactic acid may be drawn off at a convenient point near the top of the tower, and the lactic acid separated therefrom by any convenient means or, if desired may be recycled until said nitroparaffin becomes substantially saturated with respect to lactic acid and then subjected to a separation treatment. The raffinate layer which is now substantially free of lactic acid, may be withdrawn from a suitable outlet near the base of the tower. It is to be noted at this point that in some instances the positions for the withdrawal of the solvent-acid mixture and the raffinate will be reversed. For example, such is the case when extracting aqueous lactic acid solutions of low concentration with nitromethane. Ordinarily, however, it will be found that nitroparaffins are less dense than the lactic acid solutions of the type normally encountered when utilizing my invention.

My invention may be advantageously employed in the recovery of lactic acid which has been produced by the fermentation of carbohydrate-containing materials, as well as by synthetic methods. Lactic acid produced by fermentation methods contains both inorganic and organic impurities such as calcium sulfate, volatile matters, unfermentable sugars and various other impurities which tend to impart an undesirable color thereto. In the case of recovering lactic acid from fermentation liquors, the use of nitroparaffins is especially desirable because of their relatively high solvent power for lactic acid and their low degree of solvency for the common impurities mentioned above, which are associated therewith. By subjecting such solutions to extraction with nitroparaffins a high quality lactic acid, which is substantially free from impurities, is secured.

Any of the nitroparaffins may be employed in my process which are solvents for lactic acid and which are substantially non-solvents for the remaining constituents at the temperature utilized, or in certain instances where other constituents of the crude lactic acid mixture are soluble in said nitroparaffins, such materials may be selectively extracted from the nitroparaffin layer by means of a suitable solvent. As examples of nitroparaffins which may be advantageously employed as solvents in my process, there may be mentioned nitromethane, nitroethane, 1-nitropropane, 2-nitropropane, 1-nitrobutane, nitroisobutane, and the like.

The temperature at which my process is to be carried out may vary within wide limits, the only restriction being that the nitroparaffin utilized is not miscible with the crude lactic acid mixture at the temperature employed. In general, however, I prefer to carry out my process at a temperature of approximately 25° C.

My invention may be further illustrated by the following specific example:

*Example*

Aqueous lactic acid solutions of various concentrations were extracted with an equal volume of a nitroparaffin. After the mixture had been thoroughly agitated and allowed to settle, the respective volumes of each layer were noted. Equal portions of the upper and lower layers were then withdrawn and after the lactic acid contained in the nitroparaffin layer was separated therefrom by means of steam distillation, both the original aqueous layer and the acid solution resulting from the steam distillation of the nitroparaffin layer, were titrated with a standard base. The following results were obtained:

| Normality of original acid solution | Normality of original aqueous layer after extraction with— | | | |
|---|---|---|---|---|
| | Nitromethane | Nitroethane | 1-nitropropane | 2-nitropropane |
| 1.068 | .968 | 1.017 | | |
| 2.055 | 1.899 | 1.971 | 2.022 | 2.022 |
| 2.157 | 1.998 | 2.060 | 2.119 | |
| 4.243 | 3.881 | 4.060 | | |

It is to be understood, of course, that the above example is merely illustrative and the scope of my invention is not to be construed as being limited thereto.

Where it is desired to employ my invention for the purpose of continuously extracting lactic acid from crude solutions containing the same, said invention is not limited to the particular procedure which involves the continuous introduction of additional fresh nitroparaffin into the countercurrently flowing lactic acid solution, but may be carried out in accordance with any convenient manner which would readily occur to one skilled the the art. For example, the total volume of nitroparaffin employed may be reduced by recovering the nitroparaffin layer containing the extracted lactic acid, steam distilling said nitroparaffin layer, and returning the nitroparaffin to the extraction tower instead of employing a fresh nitroparaffin.

Although my invention is particularly adapted to the recovery of lactic acid from its crude aqueous solutions, it may also be applied to the recovery of other organic acids which do not form constant boiling mixtures with the nitroparaffin employed and which exhibit a sufficient degree of solubility therein. It will be obvious to those skilled in the art that numerous modifications exist in the procedure employed for carrying out my invention, such as for example it may be found desirable to utilize a mixture of two or more nitroparaffins to extract the acid from its crude mixture. Such modifications or any equivalents that would naturally occur to those skilled in the art are to be considered as lying within the scope of my invention.

My invention having now been described, what I claim is:

1. In a process for the recovery of lactic acid from crude solutions containing the same, the step which comprises contacting said crude solutions with a nitroparaffin and separating the nitroparaffin layer from the raffinate.

2. In a process for the recovery of lactic acid from crude aqueous solutions containing the same, the step which comprises contacting said crude solutions with a nitroparaffin and separating the nitroparaffin layer from the raffinate.

3. In a process for the recovery of lactic acid from crude solutions containing the same, the step which comprises subjecting said crude solutions to batch extraction with a nitroparaffin and separating the nitroparaffin recovery from the raffinate.

4. In a process for the recovery of lactic acid from crude solutions containing the same, the step which comprises subjecting said crude solutions to countercurrent extraction with a nitroparaffin and separating the nitroparaffin recovery from the raffinate.

5. In a process for the recovery of lactic acid from crude solutions containing the same, the step which comprises contacting said crude solutions with nitromethane and separating the nitromethane layer from the raffinate.

6. In a process for the recovery of lactic acid from crude solutions containing the same, the step which comprises contacting said crude solutions with nitroethane and separating the nitroethane layer from the raffinate.

7. In a process for the recovery of lactic acid from crude solutions containing the same, the step which comprises contacting said crude solutions with 1-nitropropane and separating the 1-nitropropane layer from the raffinate.

JOHN B. TINDALL.